Oct. 13, 1953 A. VERHOEFF 2,655,601
ELECTRON MICROSCOPE
Filed March 24, 1950
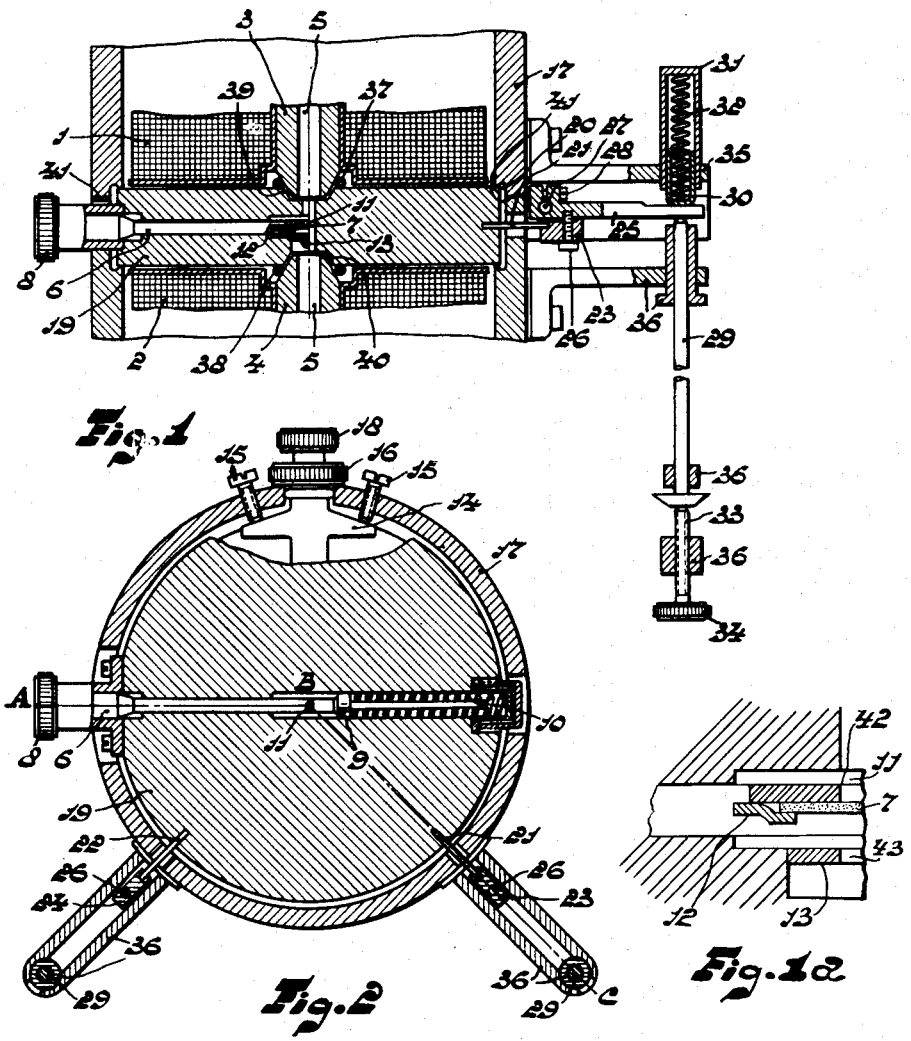
INVENTOR.
ADRIANUS VERHOEFF
BY
AGENT Patented Oct. 13, 1953

2,655,601

UNITED STATES PATENT OFFICE 2,655,601

ELECTRON MICROSCOPE

Adrianus Verhoeff, Eindhoven, Netherlands, assignor to Hartford National Bank and Trust Company, Hartford, Conn., as trustee Application March 24, 1950, Serial No. 151,596
In the Netherlands April 9, 1949

5 Claims. (Cl. 250—49.5)

This invention relates to electron microscopes, in which the object traversed by the electron rays and a limiting diaphragm are arranged close to each other in the path of rays within the apparatus. This arrangement is frequently used in order to intercept marginal rays, which are produced by dispersion in the object and which give rise to diffusion of the beam, thus detracting from the quality of the image.

The object is, as a rule, secured in a holder, which is introduced into the vacuous space, care being taken to ensure that the object is located at the centre of the beam after the introduction of the holder. The correct orientation of the object relatively to the beam often requires, that the object should be slightly displaceable in the plane at right angles to the beam of rays. This is required more particularly if a narrow beam is separated from the rays passing through the object by means of a diaphragm arranged behind the object, since the aperture in the diaphragm is smaller than the ion-section of the beam. In this case the object must be displaceable relatively to the aperture in the diaphragm, in order to find the correct adjustment essential for the reproduction of the image.

The invention relates to a construction which provides this possibility and furthermore relates to the device for displacing the object and to the air-tight seals between the displaceable parts and the fixed parts of the microscope.

According to the invention, the object is arranged in a plate-shaped disc having a central aperture to allow passage of the beam, this disc being displaceable in the plane at right angles to the path of rays and being arranged between two subsequent parts of the wall of the microscope surrounding the beam channel, an airtight seal being provided between each of these parts and the disc.

The object requires only small displacements. The largest displacement from the centre of the electron beam is about 1 millimeter, but in most cases a displacement of some few tenths of a millimeter will be sufficient. This small displacement imposes severe requirements on the moving mechanism, for example, the absence of any amount of play.

This is ensured by providing the disc comprising the object with two slightly flexible metal rods extending to the exterior and radially arranged at an angle of 90°. The ends of the rod co-operate with a lever arrangement, with the use of which push and pull forces in the direction of length of the rods can be exerted to displace the disc. In order to avoid any play between the adjusting mechanism and the lever rigidly secured to the disc, the free end of the lever is pinched between a push rod slidable in the direction of its length and co-operating with an adjusting member arranged in the proximity of the screen of the microscope and a resiliently arranged member which exerts a force on the lever in a direction against the push rod. The adjusting member brings about a displacement of the push rod and thus the desired displacement of the object relatively to the centre of the beam of rays.

The air-tight seal of the disc relatively to the adjacent stationary part of the microscope, which comprise the beam channel, may be carried out in the following manner. The disc is provided on either side of the object chamber with central recesses into which extend conical ends of the stationary parts of the microscope.

The seal is ensured with the use of toroidal rubber rings of circular section which are pressed into the angles between the conical surfaces of the stationary parts and the surfaces on either side of the disc, the rings being pressed due to the difference in pressure externally and internally of the microscope. This pressure may be increased by providing a diameter for the rings smaller than the cross-section of the embraced parts, so that the rings are widened on being displaced over the conical surfaces. The resulting stress in the material urges the rings on the surface of the disc, so that sealing is ensured even in the absence of a pressure difference.

In order that the invention may be readily carried into effect, an example will now be described in detail with reference to the accompanying drawings in which—

Fig. 1 is a longitudinal sectional view of part of an electron microscope;

Fig. 1a shows the object holder assembly of Fig. 1 in greater detail; and

Fig. 2 is a cross-sectional view of the object holder.

The left-hand half of Fig. 1 is a sectional view taken on the line AB and the right hand half is a sectional view taken on the line BC of Fig. 2.

An electron focussing system comprising a pair of magnet coils 1 and 2 which serve to produce magnetic fields for focussing lenses arranged on either side of the preparation (not shown). Each coil surrounds a central pole-piece 3, 4, respectively provided with a passage 5 for the electron beam. The two wall parts 3 and 4 embracing this beam channel leave some intermediate spacing, in which the object is arranged, an image of which is to be formed on a screen (not shown) with the use of the electron beam. The object 7 is secured to the end 42 of a holder, which is constituted by a thin rod 6. The latter is secured to a knob 8 provided on the outside of the microscope and which enables the object holder to be removed for replacement of the object. It is evident from Fig. 2 that, on removing the object holder, the channel accommodating the holder is closed, in that a valve head 9 is displaced due to pressure of a spring 10 until it closes the aperture of the channel. The object holder 6 has a small aperture 11, on which the object is clamped tight by a resilient piece of metal 12. When the object holder is arranged in the apparatus the aperture of the holder corresponds to the centre of the beam of rays.

Below the object and in the proximity thereof, is a beam diaphragm 13 constituted by a metal plate having an aperture 43 which is smaller than the aperture of the object holder. The diaphragm is clamped against the wall 17 of the microscope, with the use of the holder 14, two screws 15 and a nut 16, secured to the holder. The securing is such that, with the use of the screws 15 and the nut 16, the diaphragm aperture can be brought exactly at the centre of the beam. The beam diaphragm proper is secured to a member provided in the holder and connected with a knob 18, so that the diaphragm can be removed without any change in the adjustment of the holder. The holder extends through a radial aperture in the disc and is secured to the disc by way of a flexible coupling, which is also air-tight.

It is quite possible that it is required to examine a part of the object other than that at the centre of the beam in front of the diaphragm aperture. This could be effected by displacing the diaphragm, but this also results in a displacement of the image of the object on the screen. Therefore, it will be preferred to displace the object. For this purpose the object holder is arranged in a flat disc 19 of circular section, which is supported in a groove 20 provided in the wall 17 of the microscope, the diameter of the groove slightly exceeding that of the disc, so that the latter has a certain amount of play in any direction in the plane at right angles to the axis of the beam.

The displacement of the object is, as a rule, limited to some few tenths of a millimeter and must therefore be effected with great accuracy. The adjusting mechanism is shown in the right-hand half of Fig. 1. This figure is a sectional view taken on the line BC of Fig. 2. Connected to the disc 19 are two radial rods 21 and 22 arranged at an angle of 90° and clamped in metal blocks 23 and 24. Fig. 1 shows that block 23 is clamped on a lever 25 with the use of a screw 26. The lever 25 has a centre of rotation in the shaft 27, to which it is connected with the use of a clamping screw 28. This results in a lever arrangement, of which the short arm is secured to the disc 19 and the long arm is clamped between a push rod 29 and a member 30, which is slidable in a sleeve 31 and urged by a spring 32 to the exterior and against the lever. The clamping of the lever between the push rod 29 and the member 30 prevents play at the points of application, so that any displacement of the push rod is transmitted directly to the lever arm. This displacement is effected by means of an adjustable screw bolt 33, which is provided with a knob 34 to facilitate the control. Any play in the thread of the adjusting screw 33 is also eliminated by the pressure of the spring 32. Adjustment may be effected with the required accuracy by using micrometer thread on the adjusting screw 33. In this construction the adjusting screw may be provided in the proximity of the screen of the microscope, if push rods of sufficient length are used, so that any variation in adjustment can immediately be checked on the screen. The supports 35 and 36 for the various parts of the adjusting mechanisms are secured to the wall 17 of the microscope.

Provision must be made to ensure that air cannot penetrate into the beam channel upon movement of the disc, so that special care must be taken in sealing the disc and the stationary parts of the microscope embracing the discharge path. In the construction shown, the beam channel is located in the parts 3 and 4 and sealing is effected between these parts and the disc 19. For this purpose use is made of rubber rings 37 and 38 of circular section. The disc 19 is provided, on either side of the object space, with central recesses 39 and 40 into which extend the conical ends of the parts 3 and 4. The recesses are slightly wider than the smallest diameter of the conical ends of the parts 3 and 4, so that they do not hamper the movement of the disc. The rubber rings 37 and 38 are urged by the difference in pressure between the inside and outside of the vacuous space into the angle made between the conical surfaces of the parts 3 and 4 and the surfaces of the disc 19. By providing for the rings a diameter smaller than the cross-sections of the parts 3 and 4 at the area of sealing, so that these parts in assembling the microscope are displaced along the conical surfaces and are thus widened, it is ensured that sealing is obtained even in the absence of the pressure difference. Air is thus prevented from leaking in, when the process of exhausting of the tube is initiated.

With a view to assembling the microscope, the wall 17 is divided into two parts along the surface 41.

What I claim is:

1. In an electron microscope, an object chamber, an electron lens system arranged within said chamber comprising a pair of axially aligned tubular pole-pieces, a pair of axially aligned focussing coils, each of said coils surrounding one of said tubular pole-pieces, a disc interposed between the pole-pieces and having a central aperture therein, the surrounding surface portions of which interfit with corresponding surface portions of the tubular pole-pieces to form therewith a discharge path for an electron beam through said disc, a resilient sealing member connecting the adjoining surface portions of the disc and each pole-piece, means to move the disc in a plane perpendicular to the path of the electron beam, an object holder movable in a channel in the disc transverse to the path of the electron beam, valve closing means for sealing said channel upon withdrawal of the object holder, and a beam diaphragm in the central aperture of the disc between the object holder and one of the pole-pieces.

2. In an electron microscope, an arrangement as defined in claim 1 in which the disc moving means comprises a pair of slightly flexible rods attached at right angles to the disc, and a lever connected to one of said rods for exerting a longitudinal force on the rod thereby displacing the diaphragm in the disc relative to the center of the electron beam.

3. In an electron microscope, an arrangement as defined in claim 2 in which the free end of the lever is clamped between a push-rod and a resilient member exerting pressure on the lever against the push-rod.

4. In an electron microscope, an arrangement as defined in claim 3 in which the push rod is provided with an adjusting member positioned in the proximity of a screen for viewing the electron beam after passage through the object chamber.

5. In an electron microscope, an arrangement as defined in claim 1 in which the adjoining surface portions of the disc and the pole-pieces are conical, the disc being recessed about the aperture to receive the pole-piece.

ADRIANUS VERHOEFF.

References Cited in the file of this patent

UNITED STATES PATENTS

| Number | Name | Date |
|---|---|---|
| 2,220,973 | Marton | Nov. 12, 1940 |
| 2,361,722 | Von Ardenne | Oct. 31, 1944 |